United States Patent [19]

Barry

[11] 4,127,827
[45] Nov. 28, 1978

[54] OPTIMIZED MODE-LOCKED, FREQUENCY DOUBLED LASER

[75] Inventor: James D. Barry, Los Angeles, Calif.

[73] Assignee: The United States of America as represented by the Secretary of the Air Force, Washington, D.C.

[21] Appl. No.: 785,486

[22] Filed: Apr. 7, 1977

[51] Int. Cl.² .............................................. H01S 3/10
[52] U.S. Cl. .......................... 331/94.5 C; 331/94.5 N
[58] Field of Search .................... 331/94.5 C, 94.5 N, 331/94.5 T

[56] References Cited

U.S. PATENT DOCUMENTS

| | | | |
|---|---|---|---|
| 3,487,230 | 12/1969 | Costich | 331/94.5 C |
| 3,928,818 | 12/1975 | White | 331/94.5 T |
| 3,975,693 | 8/1976 | Barry et al. | 331/94.5 N |

Primary Examiner—William L. Sikes
Attorney, Agent, or Firm—Joseph E. Rusz; Robert Kern Duncan

[57] ABSTRACT

In a solid state, folded cavity, laser having a fundamental frequency and a second harmonic frequency, the efficiency of the laser is improved by placing a quarter wave plate, at the lower frequency, in the leg of the cavity containing the lasing element and positioning the quarter wave plate by angular rotation to compensate for any polarization discrimination to the laser rod gain.

2 Claims, 2 Drawing Figures

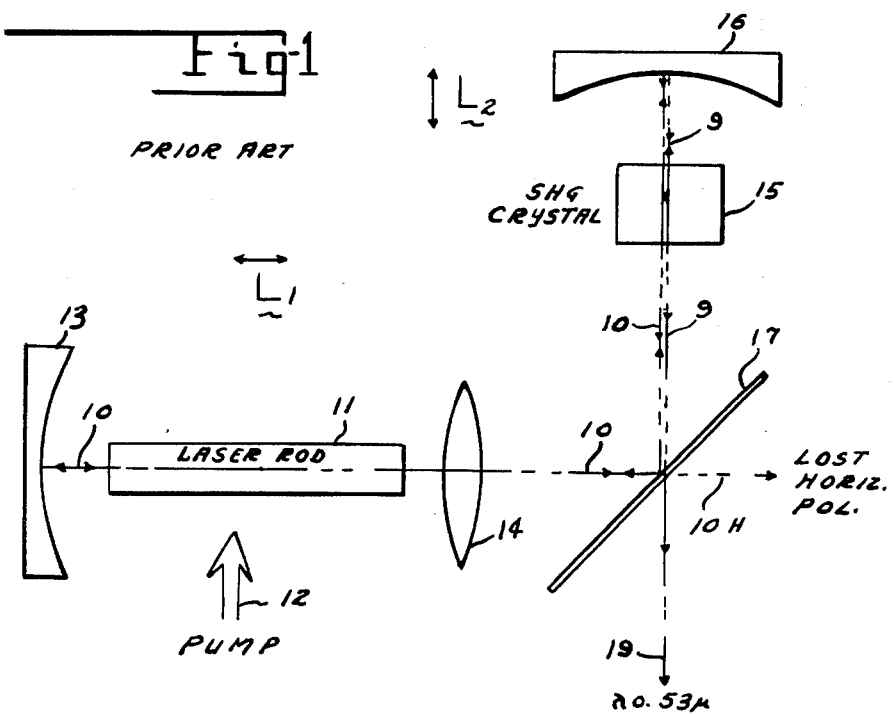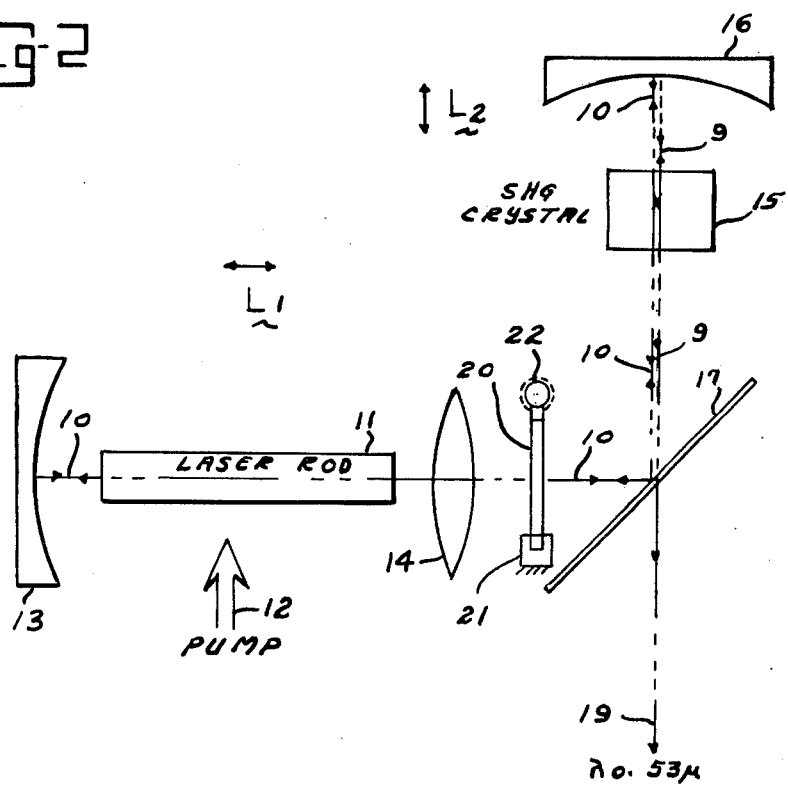

OPTIMIZED MODE-LOCKED, FREQUENCY DOUBLED LASER

RIGHTS OF THE GOVERNMENT

The invention described herein may be manufactured and used by or for the Government of the United States for all governmental purposes without the payment of any royalty.

BACKGROUND OF THE INVENTION

The field of the invention is in the laser art and more particularly in solid state, folded cavity, frequency doubled, laser structures.

Patents may be of background interest and in exemplifying the prior art are: U.S. Pat. Nos. 3,487,230 to patentee Costich; 3,548,199 to patentees Geusic et al; 3,628,044 to patentees Young et al; 3,648,193 to patentees Foster et al; 3,828,276 to patentee Cohen; and 3,975,693 to patentees Barry et al.

SUMMARY OF THE INVENTION

By reducing the power lost in the laser cavity from energy that is unfavorably polarized by correcting its polarization with a quarter wave plate improvements in the laser output (without increasing the input electrical power), from approximately 10% for relatively low power lasers (e.g., 1 watt) to approximately 50% for the high power lasers are achieved, (with constant beam diameter).

BRIEF DESCRIPTION OF THE DRAWING

FIG. 1 schematically represents typical prior art, folded cavity, two wavelength lasers; and FIG. 2 schematically represents an embodiment of the invention.

DESCRIPTION OF THE PREFERRED EMBODIMENT

In a typical prior art device as illustrated in FIG. 1, a Nd:YAG laser rod 11 is conventionally pumped 12 to provide stimulated emission. The second harmonic generator (SMG) crystal 15 provides both mode locking and frequency doubling function. A $BA_2Na(NbO_3)_5$ crystal is a typical, suitable, and conventional SMG crystal. Looking down on the figure, typical polarization of the energy is in the vertical direction, with any horizontally polarized energy generated generally being lost energy. The transmission and reflection efficiency of typical folding mirrors, such as mirror 17, have been measured for both vertical and horizontal polarizations. Generally, they are effectively 100% reflective for vertically polarized energy but can vary from approximately 10% to 97% transmissive for horizontal polarizations. The presence of the horizontally polarized light energy in a cavity which is tuned for vertically polarized energy has been found to be the result of intercavity elements. A source of horizontally polarized light apparently results from the thermally induced birefringence in the laser rod and to a much lesser extent the $Ba_2Na(NbO_3)_5$ crystal. The birefringence causes the normally vertical light to be changed to horizontally polarized light. The amount of horizontally polarized light is dependent upon the degree of birefringence which in turn is dependent upon stress caused by induced thermal gradients.

It has been determined that typical, efficient, prior art lasers as shown in FIG. 1 will have both polarizations present and that the energy of one will be suppressed, that is, the power in it lost. It has been determined that a typical, conventional, prior art laser, as illustrated by FIG. 1, would operate with about 12% more power if the birefringence induced horizontal polarization light were not caused. It is also obvious that a folded cavity frequency doubled laser would be most efficient with a single polarization and that the other polarization power will be lost and unavailable and the laser will not be as efficient at either frequency as it could be. This power loss has been found to increase dramatically for higher power lasers as the birefringence is substantially proportional to the level of pumping.

In a typical frequency doubled Nd:YAG laser having a folded cavity configuration as illustrated in FIG. 1, it is desired to effectively extract the maximum frequency doubled light 19 in a single direction. The action of frequency doubling requires a single polarization, therefore the folding mirror 17 is used to discriminate against (that is, let pass through) light horizontally polarized in the plane of the figure. Mirror 13 is highly reflective of λ1064 nm, mirror 16 is highly reflective to λ1064 nm and λ532 nm, and mirror 17 is highly reflective to vertically polarized light λ1064 nm light, transmissive to horizontally polarized light and transmissive to λ532 nm light. The frequency doubling action is caused by the SHG crystal 15. In the drawing the circulating λ1064 light is represented by beam 10, the second harmonic (frequency doubled) light at λ532 nm by beam 9, and the λ532 nm light leaving the laser for utilization by beam 19. The laser as illustrated in FIG. 1 can operate cw and mode-locked as the SMG crystal can also be used as a mode-locker as is well known in the prior art. In some instances it may be desirable to extract some fundamental frequency (i.e., λ1064 nm) energy from the system; in which case mirror 16 instead of being highly reflective at both λ1064 nm and λ532 nm is made partially transmissive to λ1064 nm, so that some λ1064 nm power may pass through the mirror and be extracted from the system for utilization. The invention is equally applicable to lasers having two output frequencies as well as to single frequency, frequency doubled laser systems.

In normal and conventional prior art operation of a frequency doubled Nd:YAG laser, an appreciable amount of its λ1064 nm power 10H is lost through the folding mirror 17, as its polarization is H rather than V as required by the SHG action. The H-polarization light is primarily caused by thermally induced birefringence in the laser rod 11. This light that is lost is essentially V-light rotated to the H-polarization by induced birefringence. The H-polarization light is consequently lost and not available for the SHG action. In low power lasers, i.e., approximately 1 watt output levels, the amount of λ532 nm power lost (by not being generated) amounts to approximately 10%. In higher power laser it may approach the 50% level.

The present disclosed system removes this polarization loss by allowing both H and V polarizations to exist yet it maximizes the λ532 nm light. The invention is schematically illustrated in FIG. 2. A quarter wave plate 20 is inserted within the $L_1$ leg of the cavity, i.e., the leg containing the laser rod 11, with the rotation axis of the QWP substantially aligned in coincidence with the laser axis 10. It is preferably positioned between the conventional lens element 14 and the conventional folding mirror element 17 in conventional ring mounting frame 21 having a worm screw adjustment 22 for rotating the QWP angularly about the axis of the beam 10. The QWP 20 effectively allows circularly polarized light to propagate in the $L_1$ section but restricts the light to V-polarization in the $L_2$ section. A QWP converts plane polarized light to circularly polarized light and vice versa. The angle of the plane polarization may be made V by rotating the QWP about the laser axis in leg $L_1$. Generally, the effective insertion loss of the QWP has been found to be 0.05% or less. Light in the $L_2$ segment is thus substantially totally V-plane polarized. The light propagating from mirror 17 to mirror 13 is altered to circularly polarized light by the QWP as it propagates on toward the laser rod and mirror 13. Circularly polarized light has both H and V-polarized components. Upon reflection by mirror 13 the circularly polarized light is transformed to V-plane polarized light as it passes through the QWP 20 in the opposite direction. Thus, there is substantially no horizontal component to pass through mirror 17 and be lost as substantially only V-polarized λ1064 light strikes the folding mirror 17 and substantially only V-polarized light is present in leg $L_2$, the proper condition for efficient second harmonic generation by the SHG crystal.

The QWP 20 effectively removes the laser rod caused birefringence losses which commonly occur in Nd:YAG lasers. The effect is more impressive as the power of the laser is increased. Normal birefringence losses are related to the laser power and level of pumping. The QWP provides for maximum oscillating power to occur by removing a polarization discrimination to the laser rod gain. Since both H and V-polarizations may exist in leg $L_1$ without one being lost, the preferred polarization is also maximized in leg $L_2$ and substantially no losses occur and hence maximum λ532 nm light is also caused to occur. It can readily be seen that an easy and generally preferred way of establishing the preferred rotational position of the QWP about the laser axis is by slowly rotating the drive screw 22 of the frame 21 holding the QWP such that the QWP is rotated about the axis of the beam 10 in leg $L_1$ while monitoring the λ532 nm power output 19. The preferred rotational position of the QWP being that which provides the maximum λ532 nm light power output. The intracavity insertion loss of the QWP is approximately 0.05% as compared to a H-polarization loss of approximately 0.1% in a low power (1 watt) laser having the prior art configuration as illustrated in FIG. 1. The H-polarization loss is many times 0.1% for higher power lasers. The improvement of at least 0.05% in loss results in an improvement of 5 to 10% in the λ532 nm laser power output when the QWP is properly positioned in typical low power lasers, and it approaches a 50% improvement in high power lasers.

The foregoing stated improvement percentages are based upon the assumption that the oscillating beam diameter is not altered after the QWP is inserted into the laser cavity. Conventionally, the beam diameter in a laser rod must be much smaller than the rod diameter due to the influence of the birefringence and diffraction effects. The birefringence is most strong in the outer ⅓ region of the rod and normally limits the beam diameter to less than that which could be used if only diffraction losses dominated. A diffraction limited beam diameter is about ⅓ the diameter of the rod while birefringence influences from the outer ⅓ region may limit the practical beam diameter to about ¼ the rod diameter. The structure including a QWP, as taught herein, allows a larger oscillating beam diameter to be used with an associated larger power. Taking this into consideration, the power increase in low power lasers approaches 50% and in high power lasers it extends to over 100%.

I claim:

1. The improvement in the second harmonic power output of a folded cavity, frequency doubling, solid state laser having a first leg and a second leg coupled by a folding mirror, the said first leg having a solid state laser rod generating a laser beam of fundamental frequency along the axis of the laser rod, the improvement comprising:
    a. a quarter wave plate at the said fundamental frequency having a central axis;
    b. means for positioning the said quarter wave plate in the said first leg such that the said axis of the quarter wave plate and the laser rod axis substantially coincide; and
    c. means for rotating the said quarter wave plate about the said laser rod axis for maximizing the said second harmonic output.

2. The laser as claimed in claim 1 wherein the said solid state laser rod is a Nd:YAG laser rod, a $Ba_2Na(NbO_3)_5$ second harmonic generation crystal is positioned in the said second leg, and the said fudamental frequency has a wavelength of approximately 1064 nanometers.

* * * * *